United States Patent
Hirayama

(10) Patent No.: US 10,432,854 B2
(45) Date of Patent: Oct. 1, 2019

(54) IMAGE PROCESSING APPARATUS TO DETERMINE WHETHER THERE IS FOG OR MIST IN A CAPTURED IMAGE

(71) Applicant: CANON KABUSHIKI KAISHA, Tokyo (JP)

(72) Inventor: Shingo Hirayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 15/831,042

(22) Filed: Dec. 4, 2017

(65) Prior Publication Data

US 2018/0160039 A1 Jun. 7, 2018

(30) Foreign Application Priority Data

Dec. 6, 2016 (JP) .................... 2016-237112
Sep. 4, 2017 (JP) .................... 2017-169598

(51) Int. Cl.
| | | |
|---|---|---|
| H04N 5/235 | (2006.01) | |
| H04N 5/232 | (2006.01) | |
| H04N 5/217 | (2011.01) | |
| H04N 5/243 | (2006.01) | |
| H04N 5/213 | (2006.01) | |
| H04N 5/202 | (2006.01) | |

(52) U.S. Cl.
CPC ......... *H04N 5/23229* (2013.01); *H04N 5/213* (2013.01); *H04N 5/217* (2013.01); *H04N 5/2351* (2013.01); *H04N 5/23203* (2013.01); *H04N 5/23293* (2013.01); *H04N 5/243* (2013.01); *H04N 5/202* (2013.01); *H04N 5/23299* (2018.08)

(58) Field of Classification Search
CPC combination set(s) only.
See application file for complete search history.

(56) References Cited

U.S. PATENT DOCUMENTS

| | | |
|---|---|---|
| 2007/0092154 A1 | 4/2007 | Kato |
| 2015/0243002 A1 | 8/2015 | Hirooka |
| 2016/0110855 A1 | 4/2016 | Hirayama |

FOREIGN PATENT DOCUMENTS

| | | |
|---|---|---|
| JP | 2002077616 A | 3/2002 |
| JP | 2015198431 A | 11/2015 |

*Primary Examiner* — Gary C Vieaux
(74) *Attorney, Agent, or Firm* — Canon U.S.A., Inc. IP Division

(57) ABSTRACT

A histogram is detected from an acquired image, and a ratio of a pixel distribution for a range from a preliminarily set low-brightness-side determination point to a preliminarily set high-brightness-side determination point to the entire histogram is calculated for the detected histogram. In a case where the ratio exceeds a preliminarily set threshold, it is estimated that there is fog or mist and a subject looks hazy.

14 Claims, 12 Drawing Sheets

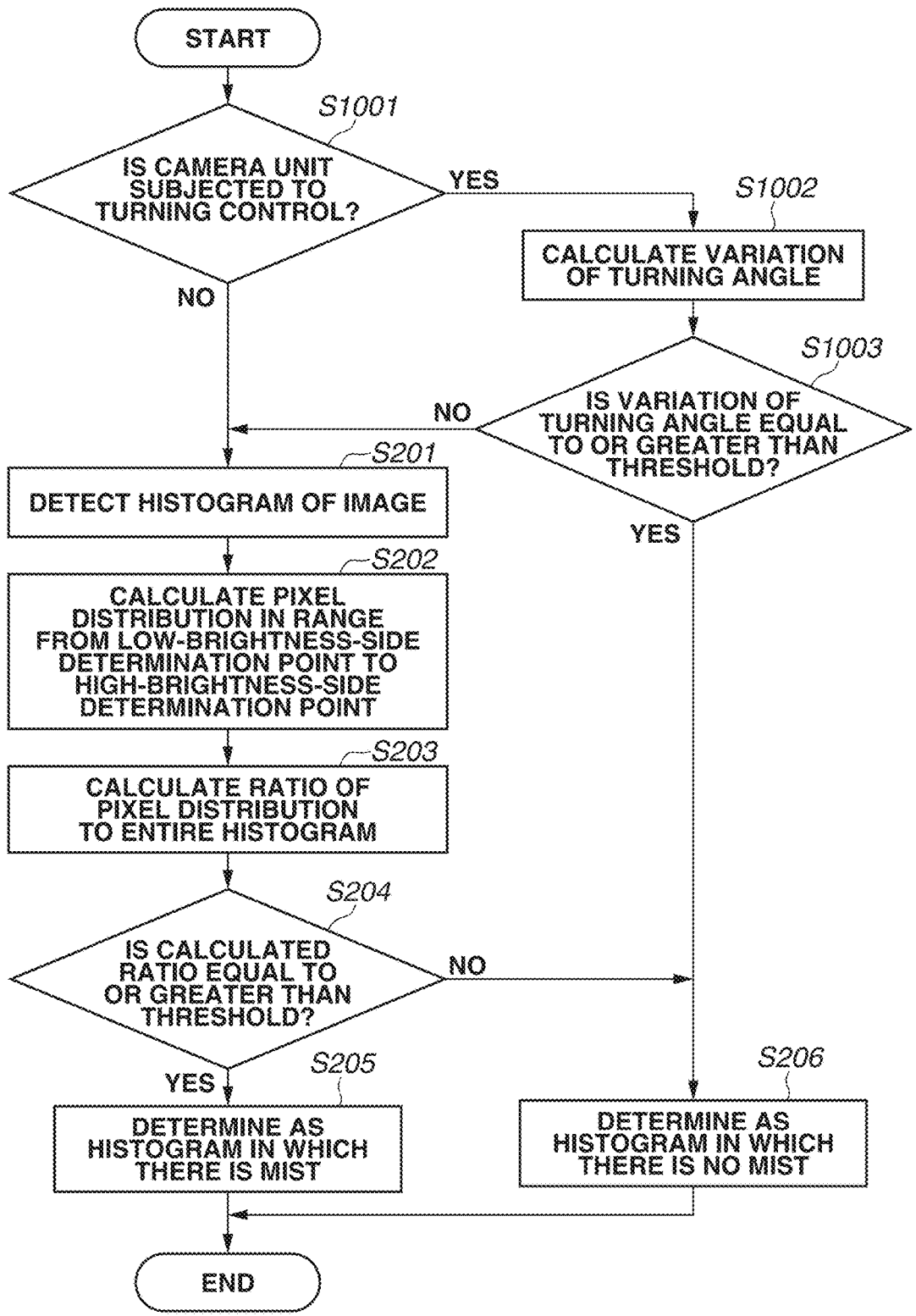

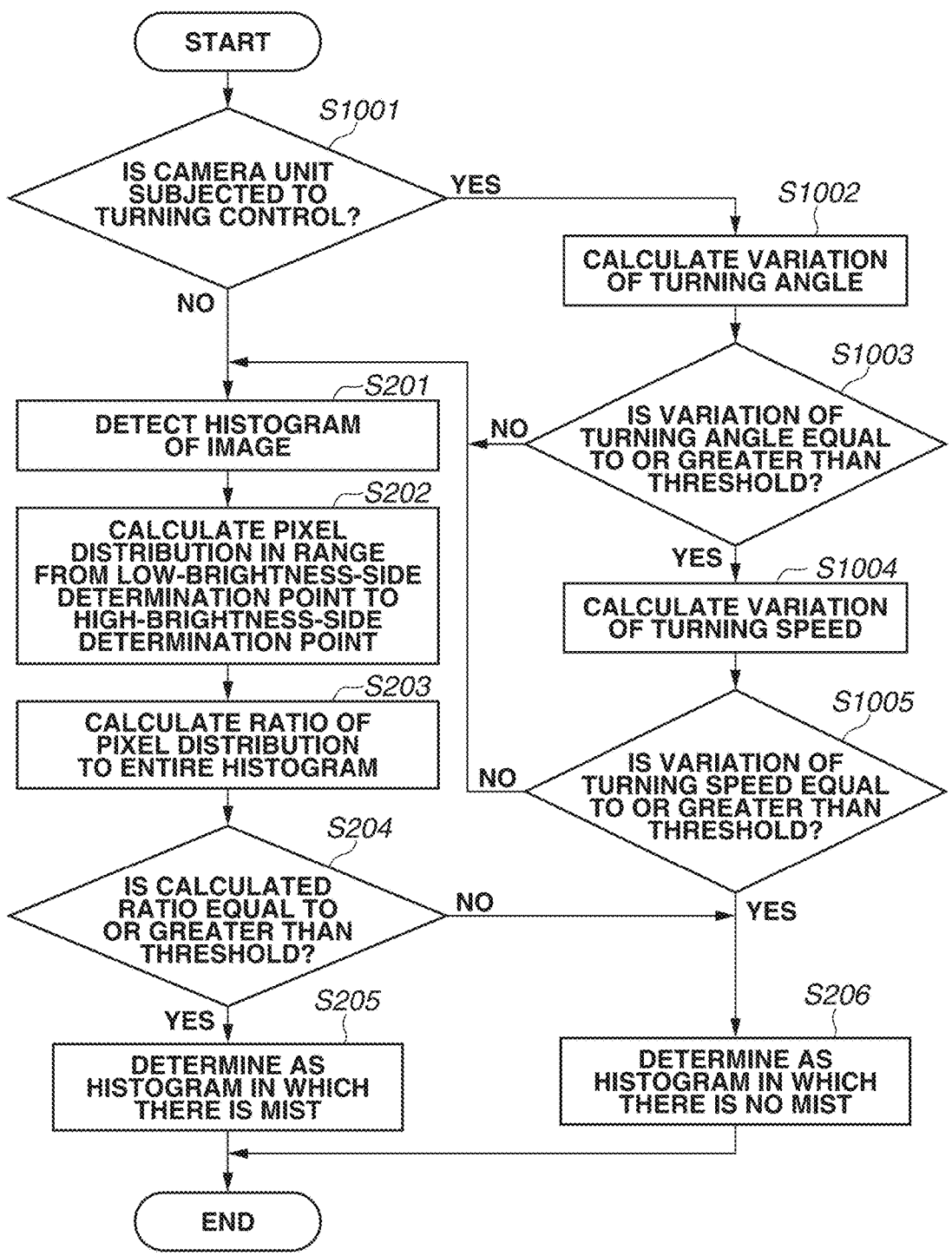

IMAGE PROCESSING APPARATUS TO DETERMINE WHETHER THERE IS FOG OR MIST IN A CAPTURED IMAGE

BACKGROUND OF THE INVENTION

Field of the Invention

The present invention relates to an image processing apparatus, a control method for the image processing apparatus, and a program, and more particularly, to an image processing apparatus configured to determine whether there is fog or mist in a captured image, a control method for the image processing apparatus, and a program therefor.

Description of the Related Art

Network cameras have heretofore been used as security means. Network cameras are placed under various environments and are required to provide video images with high visibility (e.g. of a good enough quality for recognizing a subject in the image). However, if fog or mist is present in the image capturing environment of a network camera (i.e. the image capturing conditions at the time of capturing the image include presence of fog or mist), contrast in an image of a subject decreases and the visibility of the image is impaired.

In order to acquire an image with high visibility even when the image capturing environment (i.e. image capturing conditions under which the image is captured/acquired) includes a presence of fog or mist, there is means for emphasizing a contrast when there is mist or fog. A state of fog or mist is not always constant and the density of fog or mist varies with time and thus the degree of decrease in the contrast of a video image from the presence of fog/mist varies with time. Accordingly, in the image capturing environment in which network cameras are placed, use of means for determining whether there is fog or mist and emphasizing a contrast only when there is fog or mist can be useful.

For example, in an image processing apparatus discussed in Japanese Patent Application Laid-Open No. 2015-198431, a method for determining whether there is fog or mist by comparing a contrast evaluation value of an image captured under a lighted environment (i.e. in lit condition) with a contrast evaluation value of an image captured under unlighted environment (i.e. in unlit condition) is discussed.

However, in Japanese Patent Application Laid-Open No. 2015-198431 described above, it is necessary to apply an auxiliary light to determine whether there is fog or mist. Further, there can be problems in that the accuracy of the contrast evaluation value can be adversely affected by the irradiation distance, the angle, or the like of the auxiliary light, and that a long processing time is required due to the necessity to capture a plurality of images with and without the auxiliary light.

SUMMARY OF THE INVENTION

Accordingly, the present invention is directed to providing means that enables an estimation (an assessment or a determination) of whether there is fog or mist (i.e. a fog or mist presence detection) based on a histogram of a captured image, without the need for applying an auxiliary light and capturing a plurality of images.

According to an aspect of the present invention, an image processing apparatus includes an image acquisition unit configured to acquire an image of a subject, a calculation unit configured to calculate a ratio of a number of pixels having brightness values in a brightness range to a total number of pixels in an entire image, an image processing unit configured to emphasize a contrast of the image when the ratio is equal to or greater than a first threshold, and a control unit configured to change a brightness range for calculating the ratio based on at least one of an illuminance of the subject obtained from the image and an exposure target value used when the image is acquired.

Further features of the present invention will become apparent from the following description of exemplary embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

FIG. 11 is a flowchart illustrating a histogram determination processing in which content of processing is changed depending on a turning angle in the fourth exemplary embodiment of the present invention.

FIG. 12 is a flowchart illustrating a histogram determination processing in which content of processing is changed depending on a turning speed in the fourth exemplary embodiment of the present invention.

DESCRIPTION OF THE EMBODIMENTS

Exemplary embodiments of the present invention will be described in detail below with reference to the accompanying drawings. An example of the exemplary embodiment in which an image pickup apparatus (e.g. a camera) is used as an image processing apparatus will be described below. It is understood that in other embodiments of the present invention, any other apparatus capable of acquiring/obtaining and processing an image can be used as an image processing apparatus according to the present invention.

Figure 1:
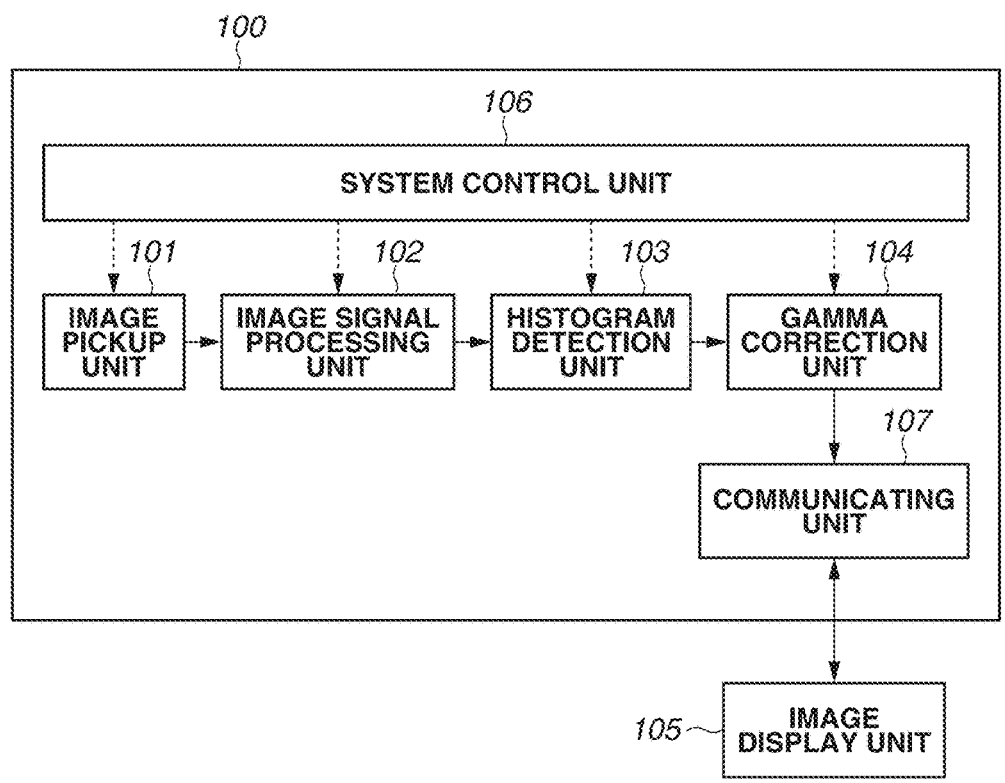
FIG. 1 is a block diagram illustrating a configuration example of an image processing apparatus according to a first exemplary embodiment of the present invention.

FIG. 1 is a block diagram illustrating a configuration example of an image processing apparatus according to a first exemplary embodiment of the present invention. Note that in FIG. 1, for conciseness, illustration of components other than an image signal processing portion/section in the image processing apparatus is omitted. The image processing apparatus according to the present exemplary embodiment includes an image pickup apparatus 100 and an image display unit 105 which is communicably connected to the image pickup apparatus 100. While the present exemplary embodiment illustrates an example in which the image pickup apparatus 100 and the image display unit 105 are provided separately, the image pickup apparatus 100 and the image display unit 105 may be provided in a single apparatus, e.g. they may be integrated together to form a single body. The image pickup apparatus 100 can take in light from the outside to generate an image signal and deliver the generated image signal to the image display unit 105 or an external device, such as a server (not illustrated) via a communicating unit 107.

An image pickup unit 101 takes in light from the outside (e.g. the surrounding) to capture an image, and generates an image signal representing surrounding subjects, thereby acquiring an image. The image pickup unit 101 includes a lens group (not illustrated), an infrared ray cut filter (IRCF), an image sensor, a correlated double sampling (CDS) circuit, an automatic gain control (AGC) amplifier, and an analog/digital (A/D) converter.

When the image pickup unit 101 captures an image of a subject, an optical image that has passed through the lens group and the IRCF is formed on the image sensor composed of a charge-coupled device (CCD) sensor, a complementary metal-oxide semiconductor (CMOS) sensor, or the like. The image sensor photoelectrically converts the formed optical image and outputs the converted signal as an analog image signal.

The CDS circuit carries out correlated double sampling processing and the like on an electrical signal received from the image sensor.

The AGC amplifier performs amplification processing and the like on the electrical signal received from the CDS circuit.

The A/D converter converts the analog signal, on which amplification processing has been performed by the AGC amplifier, into a digital signal.

An image signal processing unit 102 performs image signal processing, such as white balance (WB) processing and NR (noise reduction) processing, on the digital signal that has been converted and output by the image pickup unit 101.

A histogram detection unit 103 detects a brightness histogram from a captured image.

A gamma correction unit 104 performs a gamma correction on the captured image. For example, image processing for emphasizing a contrast is performed on the captured image by applying a gamma curve for widening gradation in a predetermined brightness range.

The image display unit 105 acquires and displays, via the communicating unit 107, the image signal processed in the above-described manner. The image display unit 105 may be configured as a part of an external terminal capable of transmitting, to the image pickup apparatus 100, a control instruction for the image pickup apparatus 100. The image display unit 105 may be a touch panel, a personal computer (PC) screen, or the like. The image display unit 105 may be configured to generate an instruction for the image pickup apparatus 100 based on an operation on the image display unit 105.

A system control unit 106 includes a central processing unit (CPU), a read-only memory (ROM), and a random access memory (RAM), which are not illustrated. The CPU controls functional blocks of the image pickup apparatus 100 and performs operations necessary therefor according to programs loaded from the ROM. The ROM stores control programs executed by the CPU and various constant values necessary for executing the programs. The RAM is an area for storing various temporary data necessary for executing the programs.

The communicating unit 107 delivers (i.e. communicates) image data processed by the image signal processing unit 102, the histogram detection unit 103, and the gamma correction unit 104 to an external client apparatus (e.g. an external terminal) such as the image display unit 105, a server, and the like. An output destination of the image data may be a liquid crystal display (LCD) incorporated in a camera, or an external display. Further, the communicating unit 107 acquires control information for the image pickup apparatus 100 that is instructed from the external terminal including the image display unit 105.

Figure 2:
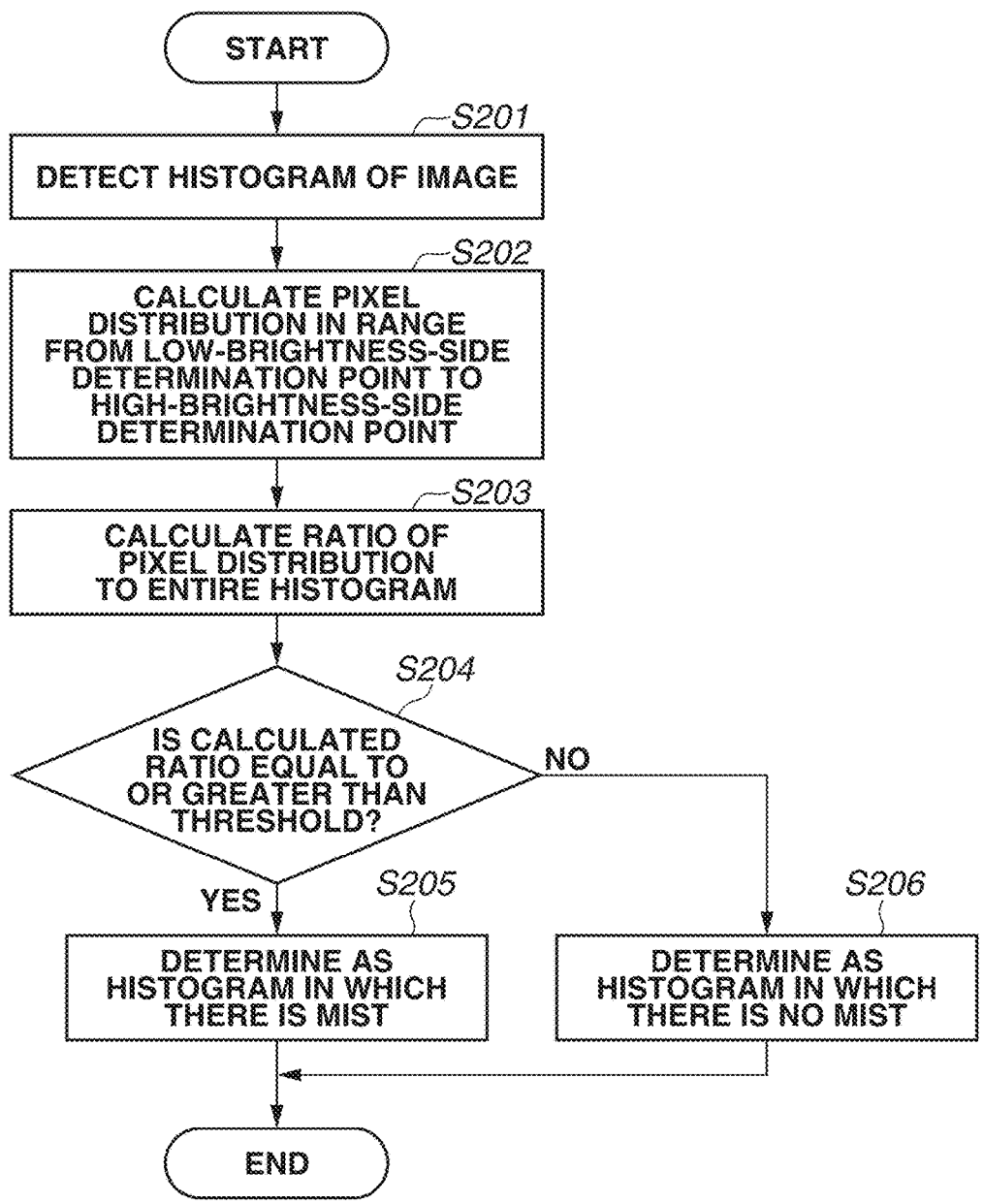
FIG. 2 is a flowchart illustrating an example of histogram determination processing according to the first exemplary embodiment of the present invention.

Referring next to FIG. 2, an example of histogram determination process performed by the image processing apparatus according to the first exemplary embodiment of the present invention will be described. FIG. 2 is a flowchart illustrating an example of the histogram determination processing according to the first exemplary embodiment of the present invention. The flowchart of FIG. 2 illustrates a processing procedure for the system control unit 106 to control the image pickup apparatus 100 by executing each processing block. The processing is implemented in such a manner that a program stored in the ROM included in each system control unit is loaded into the RAM and the program is executed by the CPU.

First, in step S201, the histogram detection unit 103 detects a brightness histogram of a captured image from image data acquired by the image pickup unit 101 by capturing an image of a subject.

Figure 3:
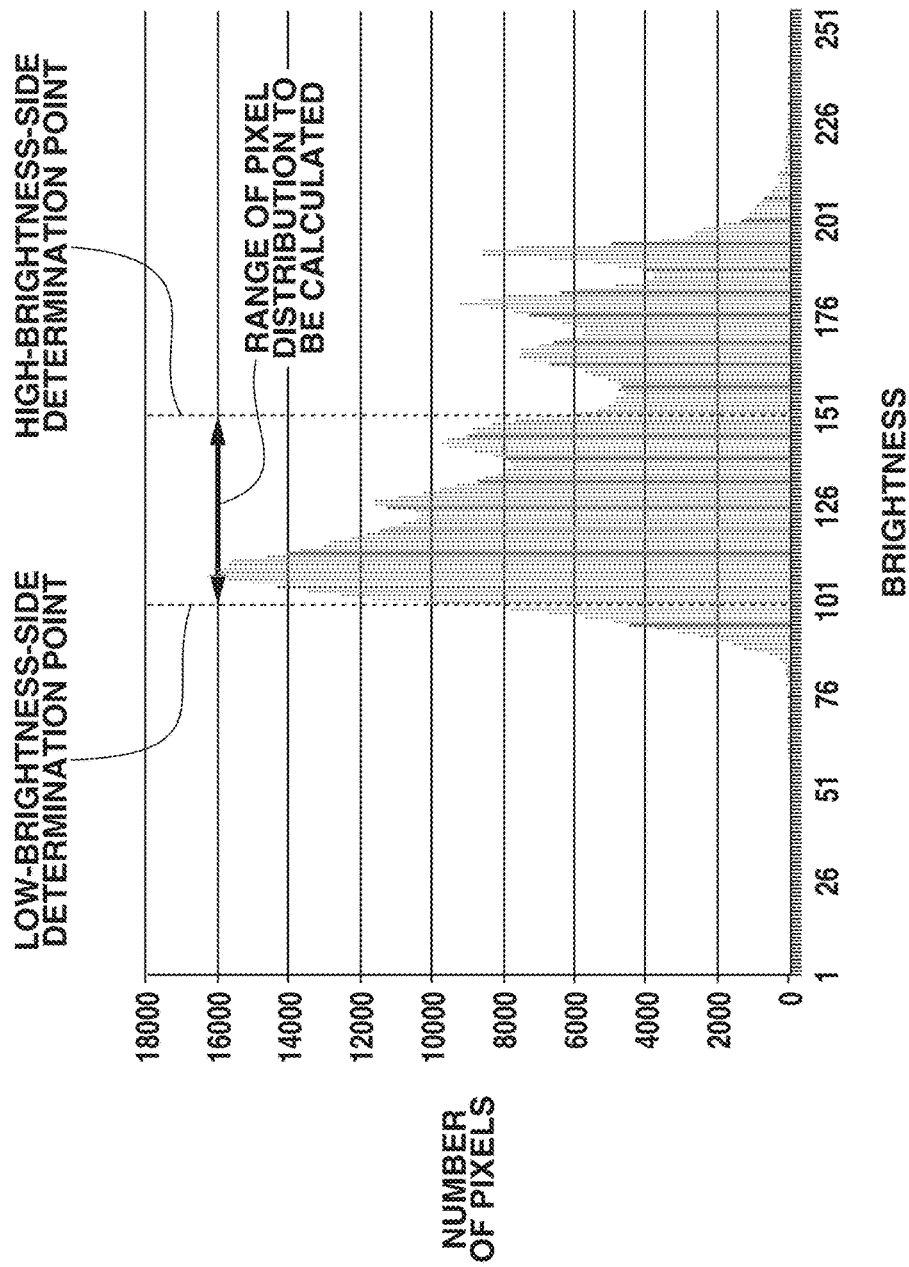
FIG. 3 is a graph illustrating a range from a low-brightness-side determination point to a high-brightness-side determination point according to the first exemplary embodiment of the present invention.

Next, in step S202, a pixel distribution for a brightness range (for example, a number of pixels with their associated brightness level/values falling in the brightness range), wherein the brightness range is defined as a range from a low-brightness-side determination point to a high-brightness-side determination point, which are preliminarily set, in the brightness histogram of the image acquired in step S201 is calculated. FIG. 3 is a graph illustrating an example of the brightness range from the low-brightness-side determination point to the high-brightness-side determination point in the histogram according to the first exemplary embodiment of the present invention. For example, when a brightness Y-value 100 is set as the low-brightness-side determination point and a brightness Y-value 150 is set as the high-brightness-side determination point, the pixel distribution for the brightness range as illustrated in FIG. 3 is calculated. The values of the low-brightness-side determination point and the high-brightness-side determination point are preliminarily set (preset) values assuming that a histogram of a hazy image is centered around halftone. For example, the values of the low-brightness-side determination point and the high-brightness-side determination point are set as predetermined values that are experimentally or empirically set depending on the application, performance, and image capturing environment (conditions) of the camera (the image pickup unit 101). The low-brightness-side determination point and the high-brightness-side determination point may be configured to be settable or changeable by a user operation.

Next, in step S203, a ratio of the distribution (i.e. the number of pixels) in the brightness range (from the low-brightness-side determination point to the high-brightness-side determination point) calculated in step S202 to the brightness histogram of the entire image (i.e. the number of pixels in the whole brightness histogram of the entire image) is calculated.

Next, in step S204, it is determined whether the ratio of the pixel distribution for the range (from the low-brightness-side determination point to the high-brightness-side determination point) to the entire brightness histogram calculated in step S203 is equal to or greater than a preliminarily set (preset) threshold. If the ratio is equal to or greater than the threshold (YES in step S204), the processing proceeds to step S205. If the ratio is less than the threshold (NO in step S204), the processing proceeds to step S206. For example, assuming that the threshold is 50%, when the pixel distribution of 50% or more falls in the above-described range, it is determined that there is fog or mist, or that the subject looks hazy. The threshold may be set or changed manually by a user operation.

When the range from the low-brightness-side determination point to the high-brightness-side determination point is widened, or when the threshold for the ratio of the pixel distribution for the range to the entire brightness histogram is decreased, it is more likely to be determined that there is fog or mist based on the histogram of the image. When the range from the low-brightness-side determination point to the high-brightness-side determination point is narrowed, or when the threshold for the ratio of the pixel distribution for the range to the entire brightness histogram is increased, it is less likely to be determined that there is fog or mist based on the histogram of the image. For example, if a user feels that the sensitivity for determining whether there is fog or mist is excessively high, the sensitivity may be lowered by changing the setting for the determination point(s) or the threshold so that it is less likely to be erroneously determined that there is fog or mist. There is a possibility that, as the range from the low-brightness-side determination point to the high-brightness-side determination point is widened, a histogram affected by a high-brightness subject or a low-brightness subject may also be included, regardless of whether there is fog/mist. Accordingly, when an adjustment is made by a user operation or the like so that it is more likely to be determined (or less likely to be determined) that there is mist or fog, it is preferable to change the setting for the threshold for the ratio of the pixel distribution for the range to the entire histogram.

If it is determined in step S204 that the ratio is equal to or greater than the threshold (YES in step S204), the processing proceeds to step S205 and it is determined that there is fog or mist, and thus a contrast emphasis processing is performed. Specifically, it is assumed that a state where the pixel distribution is centered around halftone corresponds to a state where fog or mist is present and the subject looks hazy, and thus the contrast emphasis processing needs to be performed. A conventional technique can be used for the contrast emphasis processing. For example, a gamma correction for emphasizing a contrast can be performed by widening the gradation of the brightness between the low-brightness-side determination point and the high-brightness-side determination point.

When the processing proceeds to step S206, the state of the histogram indicating no presence of fog or mist is determined, that is, the subject does not look hazy, and thus a normal gamma correction is performed by the gamma correction unit 104.

According to the exemplary embodiment described above, the ratio of the pixel distribution for the brightness range (from the low-brightness-side determination point to the high-brightness-side determination point) to the entire brightness histogram is calculated. Accordingly, based on the ratio of the brightness histogram centered around halftone, it can be determined whether the brightness histogram of the captured image is a brightness histogram indicating a presence of fog or mist.

In this case, when the illuminance of the image capturing environment (surrounding) is low, the entire histogram tends to be shifted toward a low brightness side (i.e. a side of the histogram display area with lower brightness values, e.g. brightness values beyond the low-brightness-side determination point). Therefore, when the low-brightness-side determination point and the high-brightness-side determination point are set as illustrated in FIG. 3, there is a possibility that an appropriate setting cannot be made, which makes it difficult to appropriately determine whether there is fog or mist.

As a second exemplary embodiment, histogram determination processing taking into account of shifting of the entire histogram toward the low brightness side when the illuminance of the image capturing environment is low will be described. Parts that perform the same function or processing as that in the above-described exemplary embodiment are denoted by the same reference numerals and descriptions thereof are omitted.

Figure 4:
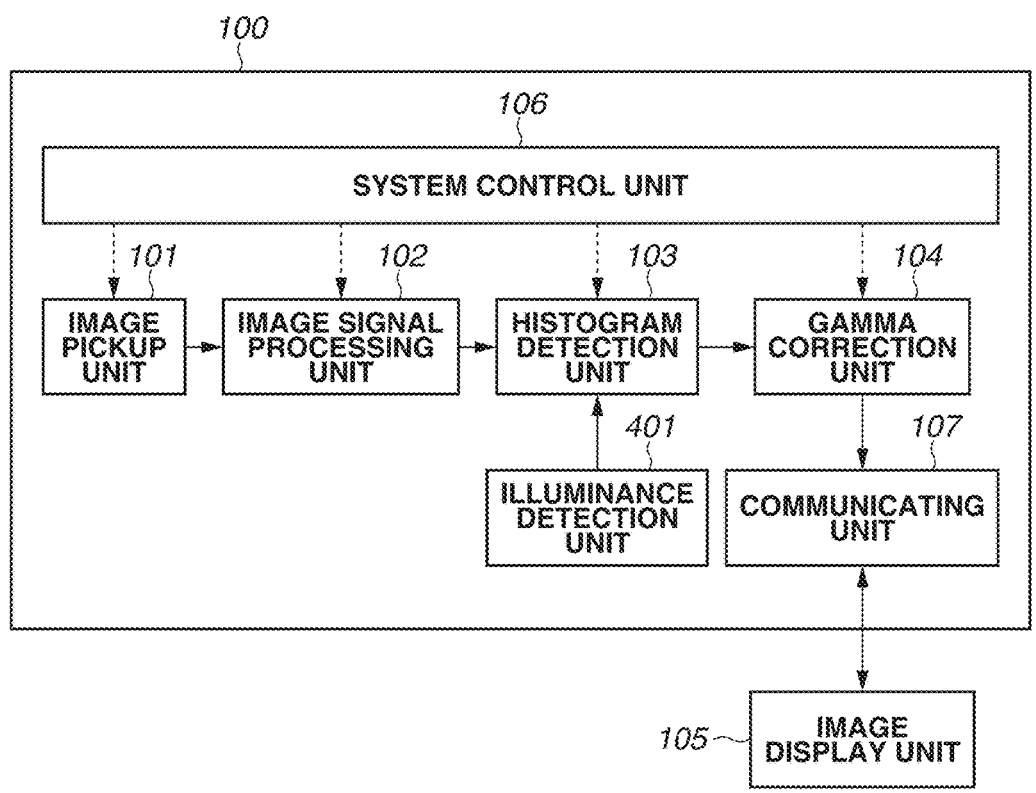
FIG. 4 is a block diagram illustrating a configuration example of an image processing apparatus according to a second exemplary embodiment of the present invention.

FIG. 4 is a block diagram illustrating a configuration example of the image processing apparatus according to the second exemplary embodiment of the present invention. In FIG. 4, the illustration of components other than an image signal processing portion/section in the image processing apparatus is omitted.

The image pickup apparatus 100 illustrated in FIG. 4 has a configuration in which an illuminance detection unit 401 is added to the image pickup apparatus illustrated in FIG. 1 in the first exemplary embodiment described above. The illuminance detection unit 401 may be configured to acquire an illuminance value using, for example, a unit configured to assess (measure) an illuminance from an image, or an external illuminance sensor, so that the illuminance detection unit 401 is capable of detecting the illuminance of the image capturing environment.

Figure 5:
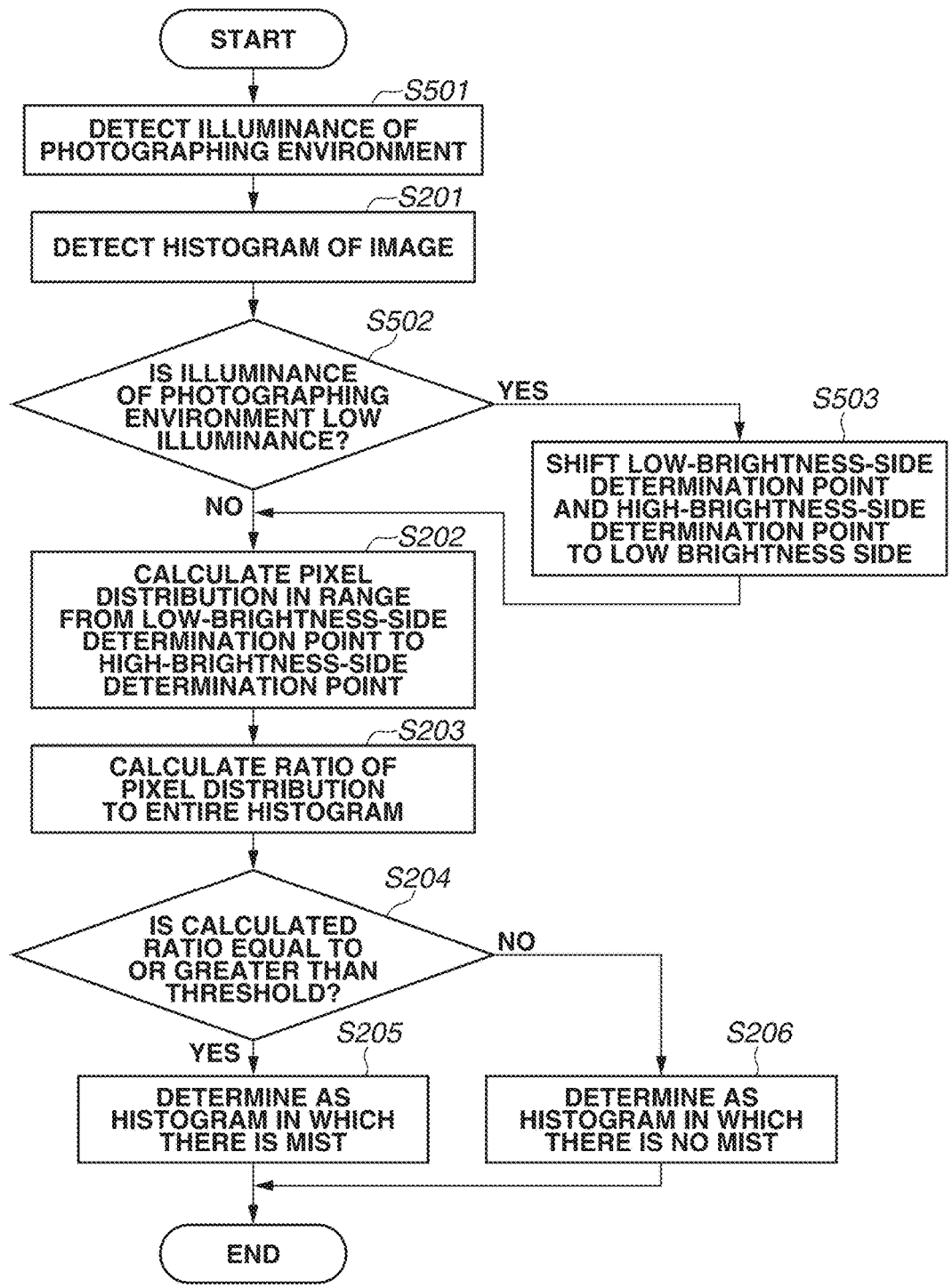
FIG. 5 is a flowchart illustrating an example of histogram determination processing according to the second exemplary embodiment of the present invention.

FIG. 5 is a flowchart illustrating an example of histogram determination process performed by the image processing apparatus according to the second exemplary embodiment of the present invention. The flowchart of FIG. 5 illustrates a processing procedure for the system control unit 106 when controlling the image pickup apparatus 100 by and executing each processing block. The processing is implemented in such a manner that a program stored in the ROM included in each system control unit is loaded into the RAM and the program is executed by the CPU. The same steps as those of the flowchart illustrated in FIG. 2 are denoted by the same step numbers and descriptions thereof are omitted.

First, in step S501, the illuminance detection unit 401 detects the illuminance of the image capturing environment (surrounding) of the image pickup apparatus 100. Next, in step S201, the histogram detection unit 103 detects a brightness histogram of an image based on the detected illuminance.

Next, in step S502, it is determined whether the illuminance of the image capturing environment (conditions) detected in step S501 is low. In the determination of the illuminance, for example, an AGC gain value may be used. When the AGC gain value is equal to or greater than a predetermined value, it may be determined that the illuminance of the image capturing environment is low. Other methods for detecting or comparing illuminance may also be employed. If it is determined that the illuminance of the image capturing environment is low (YES in step S502), the processing proceeds to step S503. If it is determined that the illuminance of the image capturing environment is not low (NO in step S502), the processing proceeds to step S202.

Figure 6:
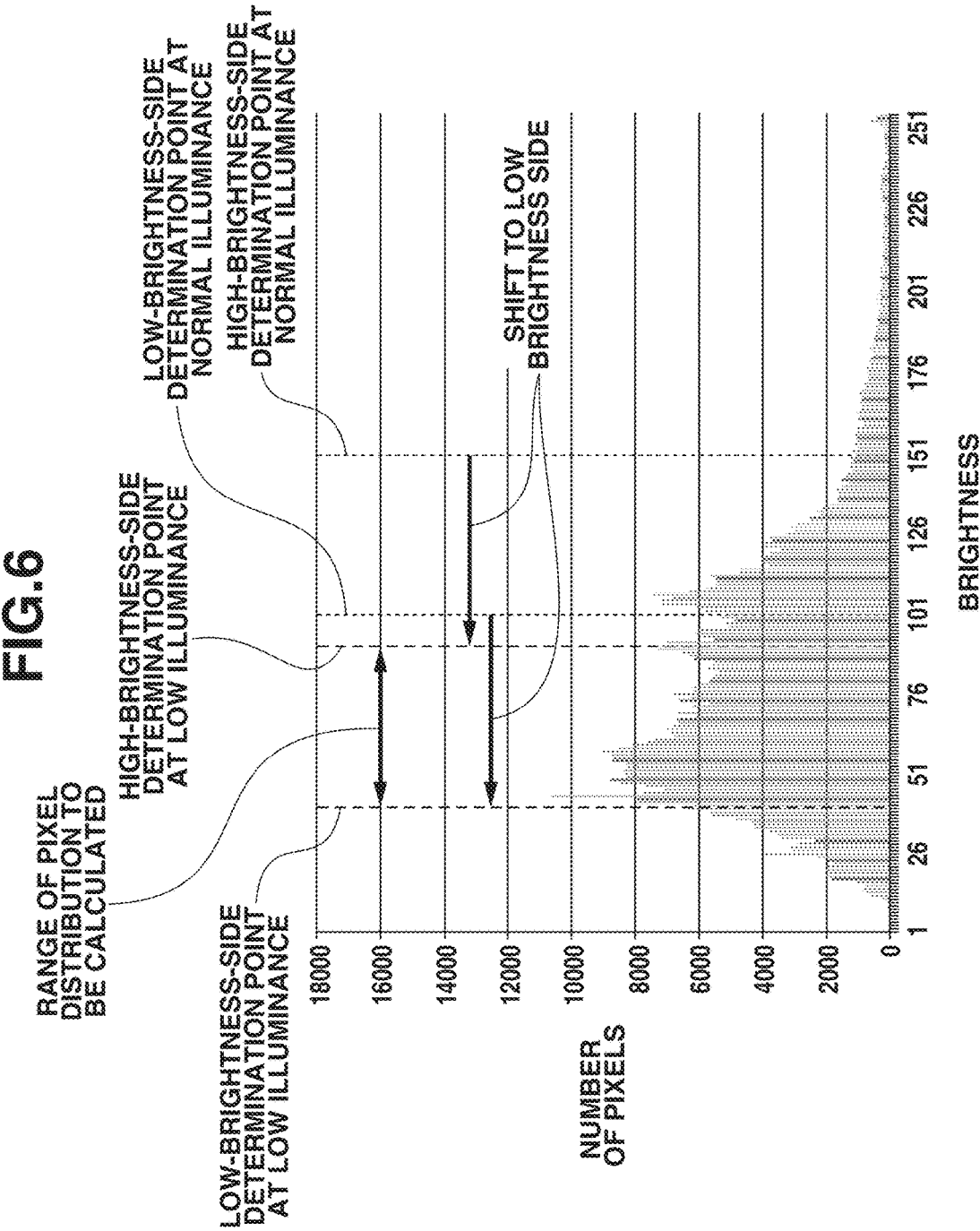
FIG. 6 is a graph illustrating an example of a range from a low-brightness-side determination point to a high-brightness-side determination point in a histogram when an image is captured under a low-illuminance environment according to the second exemplary embodiment of the present invention.

When the illuminance of the image capturing environment is low, the low-brightness-side determination point and the high-brightness-side determination point are shifted toward the low brightness side in step S503. FIG. 6 is a graph illustrating an example of the range from the low-brightness-side determination point to the high-brightness-side determination point when the histogram of the image is shifted toward the low brightness side. For example, when the brightness Y-value 100 is set as the low-brightness-side determination point at a normal illuminance, the brightness Y-value 150 is set as the high-brightness-side determination point at the normal illuminance, and −60 is set as a shift amount at a low illuminance, the low-brightness-side determination point will be shifted to a brightness Y-value 40 and the high-brightness-side determination point will be shifted to a brightness Y-value 90. The shift amount is a preliminarily set (preset) value, which is, for example, a predetermined value that is experimentally or empirically set depending on the application, performance, and image capturing environment (conditions) of the image pickup unit (i.e. the camera).

As a result, in step S202, as illustrated in FIG. 6, the pixel distribution for the range shifted toward the low brightness side is calculated and it is determined that the illuminance of the image capturing environment (conditions) was low. Consequently, an appropriate histogram determination processing can be carried out even when the histogram is shifted toward the low brightness side.

Step S203 and subsequent steps have been described above in relation to the first exemplary embodiment, and thus detailed descriptions thereof are omitted.

As described above, in the second exemplary embodiment, when it is determined that the illuminance of the image capturing environment (conditions) was low, based on the histogram in the captured image, the low-brightness-side determination point and the high-brightness-side determination point for determining whether there is fog or mist are shifted toward the low brightness side. Thus, the low-brightness-side determination point and the high-brightness-side determination point can be set taking into account of the fact that the histogram tends to be shifted toward the low brightness side under low illuminance conditions. Accordingly, even in the low-illuminance environment (condition), it can be appropriately (more accurately) determined (assessed) whether there is/was fog or mist based on the histogram of the captured image. Further, when it is determined that there is/was fog or mist and the subject looks hazy, a conventional technique can be used to perform, for example a gamma correction processing for emphasizing a contrast by widening the gradation in the brightness range between the low-brightness-side determination point and the high-brightness-side determination point.

In the exemplary embodiments described above, it is highly likely that lighting is applied at a low illuminance, and thus there is a possibility that a brightness component (histogram) based on a point light source may be detected in a high-brightness portion. Accordingly, when a point light source is detected at a low illuminance, a brightness component based on the point light source having a brightness value higher than a predetermined value may be eliminated (i.e. excluded) from a calculation for determining whether there is fog or mist (i.e. the pixels with the brightness component of the point light source are excluded/ignored for the calculation). An image processing unit may be provided separately from the image pickup unit. For example, a captured image may be output to a client apparatus, such as an external PC, via the communicating unit, and the client apparatus may execute the image processing, such as a histogram determination or a contrast emphasizing, on the communicated image.

In this case, in a case where an exposure control is changed, for example for an exposure compensation, the entire histogram is shifted. Therefore, if the low-brightness-side determination point and the high-brightness-side determination point are set as illustrated in FIG. 3, it may be difficult to appropriately (accurately) determine whether there is/was fog or mist.

Accordingly, as a third exemplary embodiment, a histogram determination process taking into account of a shifting of the entire histogram in a case where an exposure level is changed, for example for an exposure compensation, will be described. Parts that perform the same function or processing as that in the above-described exemplary embodiments are denoted by the same reference numerals and descriptions thereof are omitted. A block diagram illustrating a configuration example of the image processing apparatus according to the third exemplary embodiment is the same as the block diagram illustrating a configuration example of the image processing apparatus according to the first exemplary embodiment in FIG. 1.

Figure 7:
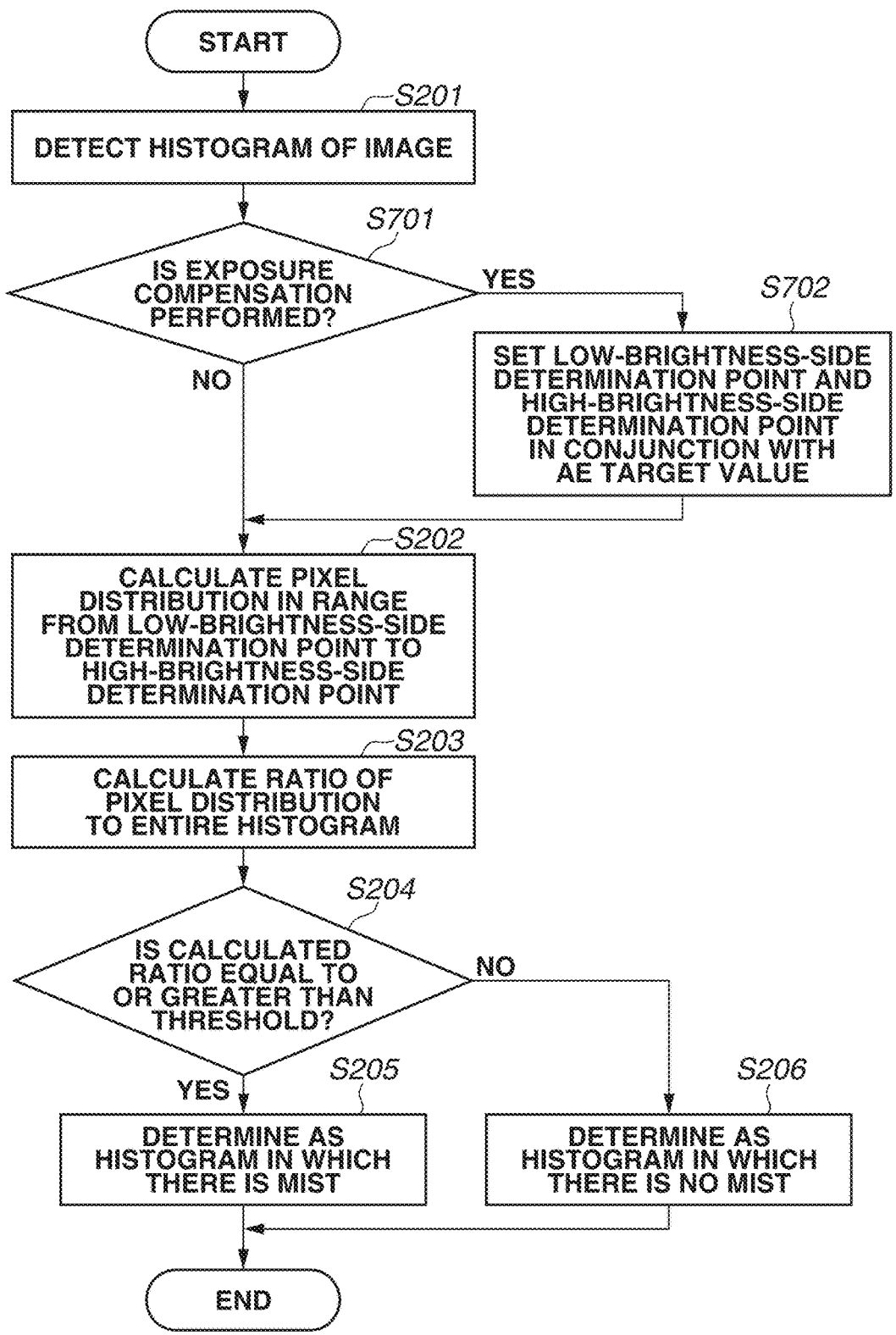
FIG. 7 is a flowchart illustrating an example of histogram determination processing according to a third exemplary embodiment of the present invention.

FIG. 7 is a flowchart illustrating an example of the histogram determination process according to the third exemplary embodiment of the present invention. The flowchart of FIG. 7 illustrates a processing procedure for the system control unit 106 when controlling the image pickup apparatus 100 by executing each processing block. The processing is implemented in such a manner that a program stored in the ROM included in each system control unit is loaded into the RAM and the program is executed by the CPU. The same steps as those of the flowchart illustrated in FIG. 2 are denoted by the same step numbers and descriptions thereof are omitted.

First, a brightness histogram of an image is detected in step S201.

Next, in step S701, it is determined whether exposure compensation is performed. Although it is determined whether an exposure compensation is (or had been/is being) performed in this case, the determination made in step S701 is not limited to the determination of whether the exposure compensation is performed, and includes any other determinations of whether an exposure control involving shifting of the entire histogram is (or had been/is being) performed. If the exposure compensation is (or had been/is being) performed (YES in step S701), the processing proceeds to step S702. If the exposure compensation is not (or had not been/is not being) performed (NO in step S701), the processing proceeds to step S202.

Figure 8:
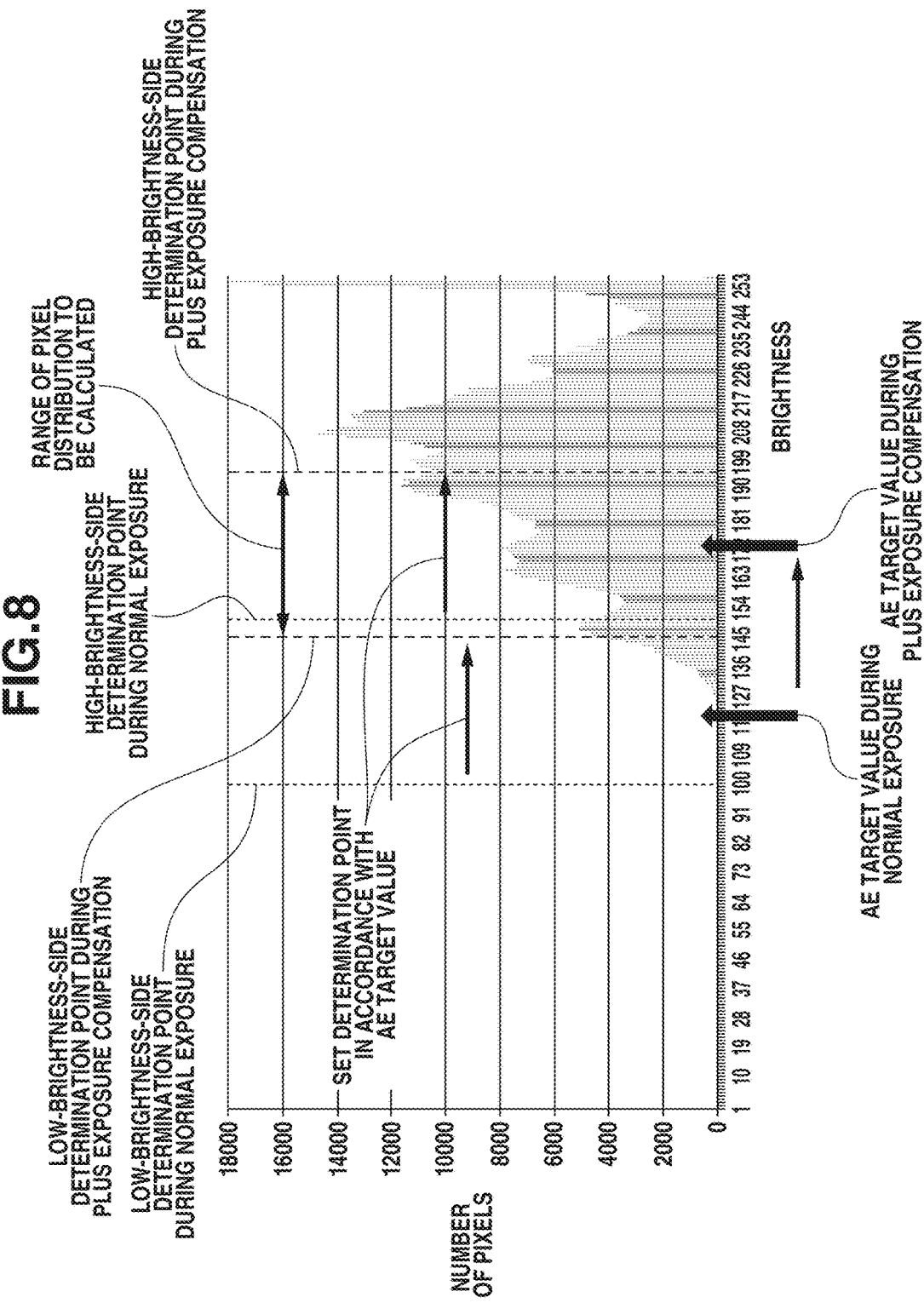
FIG. 8 is a graph illustrating a range from a low-brightness-side determination point to a high-brightness-side determination point in a histogram of an image obtained when a plus-side exposure compensation is performed according to the third exemplary embodiment of the present invention.

In step S702, the low-brightness-side determination point and the high-brightness-side determination point are set in conjunction with, i.e. based on, an automatic exposure (AE) target value. FIG. 8 is a graph illustrating an example of a range from a low-brightness-side determination point to a high-brightness-side determination point in a histogram of an image when a plus-side exposure compensation is (or had been/is being) performed (i.e. an exposure compensation for making the image brighter is/had been/is being performed). For example, assume that the low-brightness-side determination point and the high-brightness-side determination point are set as ±25 from an automatic exposure (AE) target value (i.e. −25 and +25 of AE target value respectively). When an exposure target value during a normal exposure is a brightness Y-value 125, the low-brightness-side determination point is set at the brightness Y-value 100 and the high-brightness-side determination point is set at the brightness Y-value 150. When the exposure target value during a plus-side exposure compensation is a brightness Y-value 170, the low-brightness-side determination point will be set at a brightness Y-value 145 and the high-brightness-side determination point will be set at a brightness Y-value 195. The variance values (e.g. ±25 described above) of the low-brightness-side determination point and the high-brightness-side determination point, which are set based on the automatic exposure target value (AE target value), may be preliminarily set (preset) values. For example, the variance values of the low-brightness-side determination point and the high-brightness-side determination point are set as predetermined values that are experimentally or empirically obtained/determined based on the application, performance, and image capturing environment (conditions) of the camera. As a result, in step S202, the pixel distribution for the range set based on the exposure target value as illustrated in FIG. 8 can be calculated. Consequently, an accurate histogram determination processing can be performed even when the entire histogram is shifted as a result of performing an exposure adjustment control such as an exposure compensation.

Step S203 and subsequent steps have been described above in relation to the first exemplary embodiment, and thus detailed descriptions thereof are omitted.

As described above, in the third exemplary embodiment, when an exposure adjustment control, for example for an exposure compensation, is performed, the low-brightness-side determination point and the high-brightness-side determination point for determining whether there is fog or mist based on the histogram of the captured image, are set based on the exposure target value (AE target value). Therefore, the low-brightness-side determination point and the high-brightness-side determination point can be set taking into account of the shifting of the entire histogram. Further, it can be more accurately determined whether there is/was fog or mist based on the histogram of the captured image, even when an exposure adjustment control is/had been/is being performed. Further, when it is determined that there is/was fog or mist and the subject looks hazy, a conventional technique can be used to perform processing for emphasizing the contrast in the brightness range between the low-brightness-side determination point and the high-brightness-side determination point to improve clarity of the subject in the image.

When the exposure target value (AE target value) is/has been adjusted to a plus-side (i.e. increased) in the exemplary embodiments described above, it is highly likely that the entire histogram is shifted toward the plus-side (i.e. the high brightness side or a side of the histogram display area with higher brightness values, e.g. brightness values beyond the high-brightness-side determination point), and thus the low-brightness-side determination point and the high-brightness-side determination point are also shifted toward the plus-side (i.e. adjusted/set to higher brightness values). When the exposure target value (AE target value) is/has been adjusted to a minus-side (i.e. decreased), it is highly likely that the entire histogram is shifted toward the minus-side (i.e. the low brightness side or a side of the histogram display area with lower brightness values, e.g. brightness values beyond the low-brightness-side determination point), and thus the low-brightness-side determination point and the high-brightness-side determination point are also shifted toward the minus-side (i.e. adjusted/set to lower brightness values). So the shift amount of the histogram increases as the shift (or adjustment) amount of the exposure target value (AE target value) increases. Accordingly, the low-brightness-side determination point and the high-brightness-side determination point may be set according to the shift (or adjustment) amount of the exposure target value (AE target value). Further, a threshold for determining whether the ratio of the pixel distribution for the range (from the low-brightness-side determination point to the high-brightness-side determination point) to the entire brightness histogram is equal to or greater than the threshold may be set (or determined) based on the shift (or adjustment) amount of the exposure target value (AE target value).

The histogram tends to get shifted, even when fog/mist is/was not present, as the shift (or adjustment) amount of the exposure target value (AE target value) increases. Accordingly, the distance between the low-brightness-side determination point and the high-brightness-side determination point (i.e. the width of the brightness range for the ratio) may be set shorter for the purpose of reducing/preventing an erroneous determination/detection. Alternatively or additionally, the threshold for determining whether the ratio of the pixel distribution for the range (from the low-brightness-side determination point to the high-brightness-side determination point) to the entire brightness histogram is equal to or greater than the threshold may be set to a higher value.

In some captured scenes of images, the sky can occupy a large area/portion of the captured image described in relation to the exemplary embodiments described above. Because the sky area is brighter than objects other than the sky, the larger the sky area is, the higher the ratio of the pixels on the high-brightness-side becomes. As a result, the number of pixels existing between the low-brightness-side determination point and the high-brightness-side determination point, which is a determination range for fog/mist, decreases. In such a case, fog/mist cannot be detected even when there is fog/mist in the brightness range of the subject concerned. Accordingly, when a sky area is detected within the captured image and the color saturation of the sky area is low, a pixel distribution component from the pixels for the sky area may be removed/eliminated from the calculation for determining a presence of fog or mist. That is, when calculating the pixel distribution (and the related ratio and/or threshold) for the fog/mist presence determination, the pixels for the sky area may be ignored to reduce/eliminate potentially undesirable effect from considering them in the calculation.

The exemplary embodiments described above assume that averaging photometry or center-weighted photometry is used as a photometry method. This is because, when spot photometry is employed, the entire histogram may be greatly shifted as compared with averaging photometry and center-weighted photometry. Accordingly, when spot photometry is employed as a photometry method, the low-brightness-side determination point and the high-brightness-side determination point may be shifted by an amount corresponding to the ratio of an exposure evaluation value/ an exposure target value.

The exemplary embodiments described above assume that an exposure mode AE is set. In the case of a manual exposure control, it is highly likely that the low-brightness-side determination point and the high-brightness-side determination point cannot be set appropriately. Accordingly, during the manual exposure control, the low-brightness-side determination point and the high-brightness-side determination point may be set based on the exposure evaluation value instead of the exposure target value.

The configuration for setting the low-brightness-side determination point and the high-brightness-side determination point to define the brightness range for determining whether there is/was fog/mist (i.e. for detecting a presence of fog/mist at the time of capturing the image) has been described above. However, instead of setting the low-brightness-side determination point and the high-brightness-side determination point, a histogram of a certain ratio based on the AE target value (e.g., ±10% of an AE target value) may be calculated. In this case, if the ratio of the brightness distribution of ±10% the AE target value to the entire histogram exceeds a threshold, it is determined that there is/was fog/mist.

In a case where the camera unit is provided in a configuration capable of rotating the camera unit in a pan or tilt direction, when the camera unit captures an image of a subject while it is rotating (turning/driven), the presence or no absence of fog/mist is determined based on a histogram from the turning image (i.e. the image captured while the camera unit is being rotated/turned). In this case, there is a possibility that an unintended or unnecessary image processing, such as a contrast emphasis, may be carried out.

Accordingly, as a fourth exemplary embodiment, a histogram determination processing taking into account of the rotation (turning or the change in an orientation) of the camera unit will be described. Parts that perform the same processing as that in the above-described exemplary embodiments are denoted by the same reference numerals and descriptions thereof are omitted.

Figure 9:
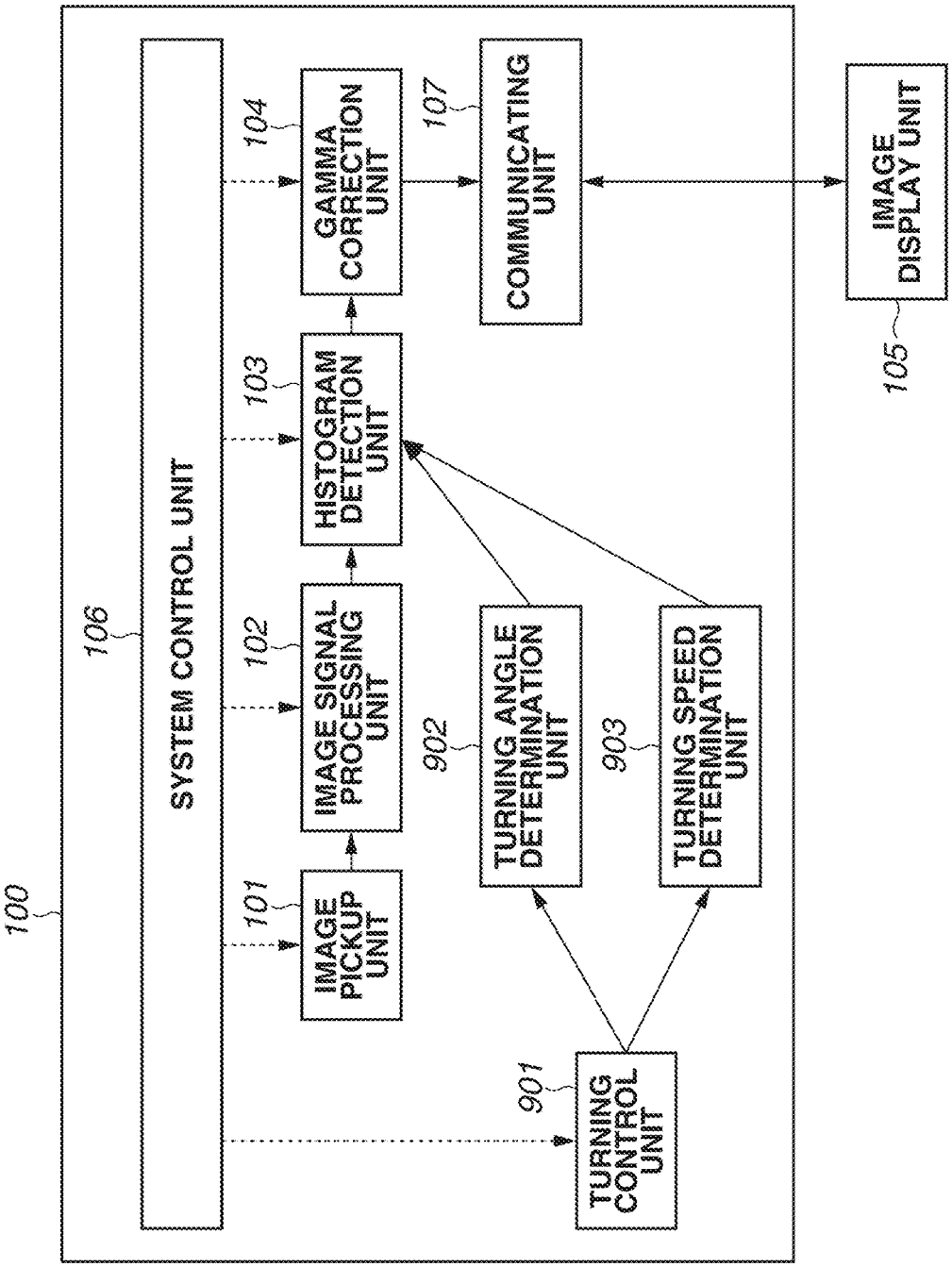
FIG. 9 is a block diagram illustrating a configuration example of an image processing apparatus according to a fourth exemplary embodiment of the present invention.

FIG. 9 is a block diagram illustrating a configuration example of the image processing apparatus according to the fourth exemplary embodiment of the present invention. The image pickup apparatus 100 illustrated in FIG. 9 includes a holding unit (not illustrated) that holds the image pickup unit 101 in such a manner that the image pickup unit 101 is able to turn with respect to a main body. The image pickup apparatus 100 also has a configuration in which a turning control unit 901, a turning angle determination unit 902, and a turning speed determination unit 903 are added to the image pickup apparatus illustrated in FIG. 1 in the first exemplary embodiment described above.

Figure 10:
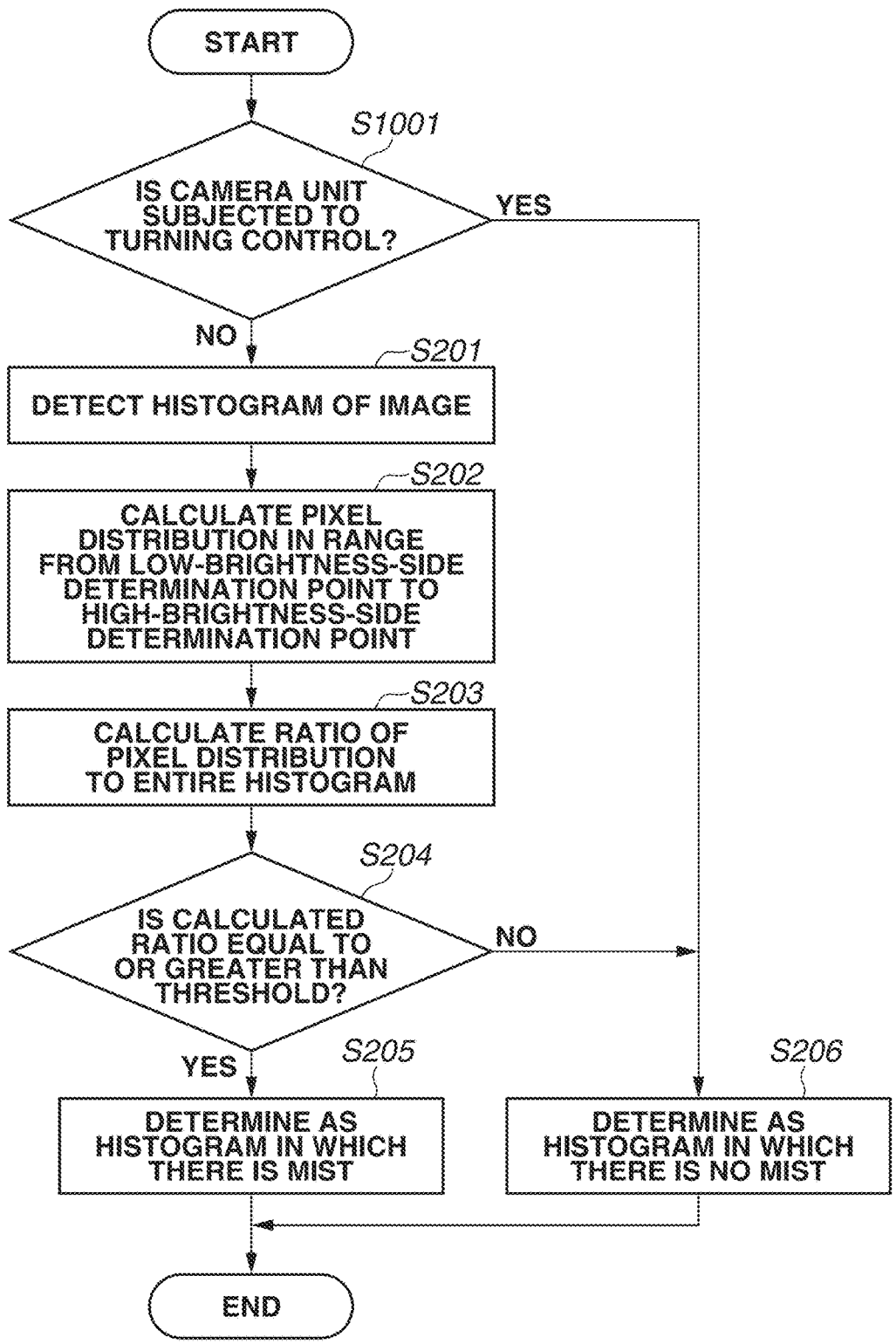
FIG. 10 is a flowchart illustrating an example of histogram determination processing according to the fourth exemplary embodiment of the present invention.

FIG. 10 is a flowchart illustrating an example of the histogram determination processing according to the fourth exemplary embodiment of the present invention. The flowchart of FIG. 10 illustrates a processing procedure for the system control unit 106 for controlling the image pickup apparatus 100 by executing each processing block. The processing is implemented in such a manner that a program stored in the ROM included in each system control unit is loaded into the RAM and the program is executed by the CPU. The same steps as those of the flowchart illustrated in FIG. 2 are denoted by the same step numbers and descriptions thereof are omitted.

First, in step S1001, it is determined whether the camera unit configured to capture an image of a subject is/has been/is being rotated/turned (i.e. driven to change its orientation or position in the pan direction, or driven to change its orientation or position in the tilt direction) by the turning control unit (orientation control unit) 901. If it is determined that the camera unit is/has been/is being turned (YES in step S1001), the processing proceeds to step S206. If it is determined that the camera unit is not/has not been/is not being turned (NO in step S1001), the processing proceeds to step S201.

Subsequent steps have been described above in the first exemplary embodiment, and thus detailed descriptions thereof are omitted.

As described above, in the fourth exemplary embodiment, in a case where the camera unit is/has been/is being turned, it is determined that the histogram indicates that there is no fog/mist, or the determination as to whether there is fog/mist is not performed. Thus, even in a case where the camera unit is turned, it is possible to prevent unintended image processing, such as contrast emphasis, from being performed, and preventing an erroneous determination of fog/mist presence/absence in the image captured while the camera unit is turning.

In a case where the camera unit is turned with a small change in an angle of view, it is sometimes better to continue with the processing for determining whether there is fog/mist based on the histogram of the turning image. Accordingly, in the exemplary embodiments described above, a different processing may be employed depending on the turning angle of the camera unit as illustrated in the flowchart of FIG. 11. In the flowchart of FIG. 11, steps S1002 and S1003 are added to the flowchart of FIG. 10. The same steps as those of the flowchart illustrated in FIG. 10 are denoted by the same step numbers and descriptions thereof are omitted.

First, if it is determined in step S1001 that the camera unit is/has been/is being turned (YES in step S1001), the processing proceeds to step S1002. If it is determined that the camera unit is not/has not been/is not being turned (NO in step S1001), the processing proceeds to step S201.

In step S1002, the turning control unit (orientation control unit) 901 calculates a turning angle of the camera unit (i.e. an angular change in the orientation of the camera unit), and the processing proceeds to step S1003.

In step S1003, it is determined whether the turning angle (i.e. the angular change) calculated in step S1002 is equal to or greater than a predetermined threshold. If it is determined that the turning angle is equal to or greater than the predetermined threshold (YES in step S1003), the processing proceeds to step S206. If the turning angle is less than the predetermined threshold (NO in step S1003), the processing proceeds to step S201. For example, the predetermined threshold may be set based on, for example, whether there is an overlapping portion between angles of view (i.e. viewing angles) obtained before and after the turning/rotation (e.g. when the camera has an angle of view of 30°, an overlapping portion may be present for a turning angle of less than 30°). Further, the setting of the predetermined threshold may be performed by a manual user operation.

Subsequent steps have been described above in the first exemplary embodiment, and thus detailed descriptions thereof are omitted.

Even if the camera unit is turned with a large variation in the angle of view (i.e. by a large turning angle), in a case where the turning speed of the camera unit is low, it is sometimes better to continue with the processing for determining whether there is fog/mist, based on the histogram of the turning image. Accordingly, in the exemplary embodiments described above, different processing may be employed depending on the turning speed of the camera unit as illustrated in the flowchart of FIG. 12. In the flowchart of FIG. 12, steps S1004 and S1005 are added to the flowchart of FIG. 11. The same steps as those of the flowchart illustrated in FIG. 11 are denoted by the same step numbers and descriptions thereof are omitted.

First, if it is determined in step S1001 that the camera unit is/has been/is being turned (YES in step S1001), the processing proceeds to step S1002. If it is determined that the camera unit is not/has not been/is not being turned (NO in step S1001), the processing proceeds to step S201.

In step S1002, a turning angle of the camera unit is calculated and it is determined in step S1003 whether the calculated turning angle is equal to or greater than a predetermined threshold. If the calculated turning angle is equal to or greater than the predetermined threshold (YES in step S1003), the processing proceeds to step S1004. If the calculated turning angle is less than the threshold (NO in step S1003), the processing proceeds to step S201.

In step S1004, the turning control unit (orientation control unit) 901 calculates the turning speed of the camera unit (i.e. the speed at which the camera unit rotates/turns/changes its orientation), and the processing proceeds to step S1005.

In step S1005, it is determined whether the turning speed calculated in step S1004 is equal to or greater than a predetermined threshold. If the calculated turning speed is equal to or greater than the predetermined threshold (YES in step S1005), the processing proceeds to step S206. If the calculated turning speed is less than the predetermined threshold (NO in step S1005), the processing proceeds to step S201. As the predetermined threshold, for example, a speed value above which human eyes cannot follow the rotation of the camera unit (i.e. a speed at which human vision is no longer able to recognize a subject in the captured image) may be set. This processing makes it possible to determine whether there is fog/mist, based on a histogram, in the case where the camera unit is turned at a low speed at which the turning camera unit can be followed by human eyes, while it skips determining whether there is fog/mist based on a histogram of an image obtained while the camera unit is being turned at a high speed at which the turning camera unit cannot be followed by human eyes (i.e. the subject in the captured image is not recognizable to human eyes due to the high speed turning/rotation). Furthermore, a predetermined threshold for determining based on a speed of rotation of the camera unit may be set or changed by a manual user operation.

Subsequent steps have been described above in the first exemplary embodiment, and thus detailed descriptions thereof are omitted.

The exemplary embodiments of the present invention have been described above. However, the present invention is not limited to the exemplary embodiments described above, but instead should be modified as appropriate depending on a target circuit form, within the scope of the technical idea of the present invention. For example, it is understood that as long as a ratio of a number of pixels included in the brightness range (between the low-brightness-side determination point and the high-brightness-side determination point) to a number of pixels in the entire image can be calculated, it is possible to implement an embodiment of the present invention, and thus detection/determination of a brightness histogram may not be necessary in certain embodiments. In addition, the camera described as the image pickup apparatus in the exemplary embodiments described above can be a digital still camera and/or a digital video camera.

The present invention may also be embodied as, for example, a system, an apparatus, a method, a computer program, or a recording medium. Specifically, the present invention may be implemented by a single apparatus or may be applied to a system composed of a plurality of apparatuses. Each unit constituting the image processing apparatus according to the exemplary embodiments (which includes the image pickup apparatus) and each step of the control method for the image processing/pick apparatus can also be implemented by operating a program stored in a memory of a computer or the like. Such a computer program and a computer-readable recording medium recording the program thereon are also encompassed by the present invention.

The present invention can also be implemented by processing in which a program for implementing one or more functions of the exemplary embodiments described above is supplied to a system or an apparatus via a network or a storage medium, and one or more processors in a computer of the system or apparatus read and execute the program. The present invention can also be implemented by a circuit (e.g., ASIC) for implementing one or more functions.

According to the present invention, it is possible to determine (estimate) whether there is/was fog or mist based on a histogram of a captured image, without the need for applying auxiliary light and capturing a plurality of images.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments.

This application claims the benefit of Japanese Patent Applications No. 2016-237112, filed Dec. 6, 2016, and No. 2017-169598, filed Sep. 4, 2017, which are hereby incorporated by reference herein in their entirety.

What is claimed is:

1. An image processing apparatus comprising:
   an image acquisition unit configured to acquire an image of a subject;
   a calculation unit configured to calculate a ratio of a number of pixels having brightness values in a brightness range to a total number of pixels in an entire image;
   an image processing unit configured to emphasize a contrast of the image when the ratio is equal to or greater than a first threshold; and
   a control unit configured to change a brightness range for calculating the ratio based on at least one of an illuminance of the subject obtained from the image and an exposure target value used when the image is acquired.

2. The image processing apparatus according to claim 1, wherein the control unit is configured to change the brightness range for calculating the ratio to include more lower brightness values when the illuminance is lower than a predetermined threshold.

3. The image processing apparatus according to claim 1, further comprising a first threshold changing unit configured to change the first threshold based on the illuminance.

4. The image processing apparatus according to claim 1, further comprising a point light source detection unit configured to detect a brightness component of a point light source from the image,
   wherein the calculation unit is configured to calculate the ratio while excluding, from the calculation, pixels with the brightness component of the point light source in a case where the brightness component of the point light source is detected.

5. The image processing apparatus according to claim 1, wherein the control unit is configured to change the brightness range for calculating the ratio to:
   include more higher brightness values when the exposure target value is set for increasing brightness;
   include more lower brightness values when the exposure target value is set for decreasing brightness.

6. The image processing apparatus according to claim 1, wherein the control unit is configured to narrow the brightness range for calculating the ratio as an amount of change in the exposure target value increases.

7. The image processing apparatus according to claim 1, further comprising a second threshold changing unit configured to change the first threshold according to an amount of change in the exposure target value,
   wherein the second threshold changing unit is configured to set the first threshold to a higher value as the amount of change in the exposure target value increases.

8. The image processing apparatus according to claim 1, wherein, in a case of spot photometry, the control unit is configured to change the brightness range for calculating the ratio based on an exposure evaluation value and the exposure target value.

9. The image processing apparatus according to claim 1, wherein, in a case where an exposure control is manually performed, the control unit is configured to change the brightness range for calculating the ratio based on an exposure evaluation value and not based on the exposure target value.

10. The image processing apparatus according to claim 1, wherein, in a case where the image of the subject includes a sky area determined to be an image area capturing the sky and a color saturation of the sky area is low, the calculation unit is configured to calculate the ratio by excluding pixels for the sky area of the entire image from the calculation.

11. The image processing apparatus according to claim 1, further comprising a driving unit configured to rotate the image acquisition unit in at least one of a pan direction and a tilt direction,
    wherein the image processing unit is configured to not perform the emphasizing in a case where the driving unit rotates the image acquisition unit.

12. The image processing apparatus according to claim 11, wherein the image processing unit is configured to perform the contrast emphasis processing based on the ratio in a case where a turning angle of the image acquisition unit is smaller than a predetermined value.

13. The image processing apparatus according to claim 11, wherein the image processing unit is configured to perform the contrast emphasis processing based on the ratio in a case where a turning angle of the acquisition unit is equal to or greater than a first predetermined value and a turning speed of the acquisition unit is equal to or greater than a second predetermined value.

14. The image processing apparatus according to claim 1, further comprising a changing unit configured to be able to arbitrarily change, according to a user operation, at least one of the first threshold and the brightness range for calculating the ratio.

* * * * *